(12) United States Patent
Bolzmann et al.

(10) Patent No.: US 7,826,949 B2
(45) Date of Patent: Nov. 2, 2010

(54) METHOD FOR DETERMINING THE STEERING RATIO OF A VEHICLE

(75) Inventors: Oliver Bolzmann, Hannover (DE); Bernd Heuer, Nordstemmen (DE); Ulrich Von-Behren, Hannover (DE); Thomas Wolf, Bloomfield Hills, MI (US)

(73) Assignee: WABCO GmbH, Hannover (DE)

( * ) Notice: Subject to any disclaimer, the term of this patent is extended or adjusted under 35 U.S.C. 154(b) by 934 days.

(21) Appl. No.: 11/705,818

(22) Filed: Feb. 12, 2007

(65) Prior Publication Data

US 2007/0203627 A1 Aug. 30, 2007

(30) Foreign Application Priority Data

Feb. 22, 2006 (DE) .................... 10 2006 008 156

(51) Int. Cl.
*B62D 5/04* (2006.01)

(52) U.S. Cl. ........................................ 701/41; 180/446
(58) Field of Classification Search .................. 701/36, 701/41–43; 180/441–446
See application file for complete search history.

(56) References Cited

U.S. PATENT DOCUMENTS 7,065,436 B2 * 6/2006 Hara ............................ 701/41
7,620,485 B2 * 11/2009 Gronau et al. ................ 701/41
7,676,308 B2 * 3/2010 Klier ............................ 701/41

\* cited by examiner

*Primary Examiner*—Richard M. Camby
(74) *Attorney, Agent, or Firm*—Kramer Levin Naftalis & Frankel LLP

(57) ABSTRACT

A method for determining the steering ratio of a vehicle from sensed measured values (e.g., yaw rate, steering wheel angle, vehicle speed) in a manner that takes vehicle parameters (e.g., self-steering gradient, wheelbase and other vehicle dimensions) into consideration during stable travel of the vehicle.

19 Claims, 2 Drawing Sheets

METHOD FOR DETERMINING THE STEERING RATIO OF A VEHICLE

BACKGROUND OF THE INVENTION

The present invention is directed generally to an improved method for determining the steering ratio of a vehicle.

To an increasing extent, electronic systems for improving vehicle safety, such as, for example, anti brake-lock systems (ABS), electronic stability programs (e.g., ESP: electronic stability program; ESC: electronic stability control) or programs for preventing vehicle rollover (RSC: roll stability control), are being built into modern vehicles. To ensure that these electronic systems operate as efficiently and safely as possible, numerous different vehicle parameters and sensor measurements are sensed and evaluated.

In this respect, the steering angle of the vehicle has proved to be an important parameter. In some electronic systems (such as in ESP and ESC or in RSC), a control action such as active engagement of the vehicle brakes is exerted as a function of steering angle. Exact sensing of the steering angle is therefore very important for such a control action.

The measure conventionally used for the steering angle is the rotation of the vehicle's steering wheel (steering wheel angle), which is sensed by means of a steering wheel angle sensor mounted on the steering column of the vehicle. The steering angle of the vehicle, that is, the angular displacement of the steered vehicle wheels, is then inferred from the angular displacement of the steering wheel. In this approach, either a constant value is assumed for the steering ratio over the entire steering range, or, in other words, for the ratio between the rotation of the steering wheel and the rotation of the steered vehicle wheels, or several values are used for the steering ratio as a function of different steering wheel angles, in order to represent as realistically as possible nonlinear steering ratios caused by the existing steering geometry. Conventionally, these values had to be laboriously determined and manually input into, for example, an electronic stability program (e.g., ESP, ESC).

Accordingly, it is desired to provide a method for determining the steering ratio of the vehicle in a simple and cost-effective manner.

SUMMARY OF THE INVENTION

Generally speaking, in accordance with the present invention, a method for determining the steering ratio of a vehicle is provided which improves over prior art methods.

According to one embodiment of the present invention, a yaw rate and a steering wheel angle of the vehicle as well as the vehicle speed are used as sensed measured values. The yaw rate can be measured by means of a yaw rate sensor, and the steering wheel angle can be measured by means of a steering wheel angle sensor.

According to another embodiment of the inventive method, the steering ratios associated with various steering wheel angles known as grid points are determined so that the real steering ratio can be simulated as accurately as possible.

In accordance with a further embodiment of the present invention, the variation of the steering ratio is simulated by means of an approximation, wherein the steering wheel angle is divided into individual ranges. For this purpose, a steering ratio is determined for the various steering wheel angles and the current yaw rates. The steering ratios yield a table or a data matrix that can reside in a data memory of an electronic system. From this table or the data matrix, a system that executes a control action, for example as a function of the steering ratio, can draw a value for the steering ratio in the simplest manner as a function of the existing steering wheel angle. Thereby, a more accurate control action is achieved.

According to yet another embodiment of the inventive method, values of yaw rate and/or steering wheel angle and/or lateral acceleration that have been compensated for zero-point drift are used. Average values formed from the values of yaw rate and/or steering wheel angle and/or lateral acceleration are used for compensation. Thereby, an inaccurate installation position of the sensor is compensated for, as is a time-dependent or thermal change of the sensor value that can lead to drift of the zero point of the sensor.

According to a still further embodiment of the present invention, the average values are formed in a manner that takes a driving distance and/or a time dependence into consideration. Because of the large number of measured values accumulated in the course of vehicle operation, high accuracy is achieved in the average values formed from the measured values.

It will be appreciated that an advantage of the method according to the present invention resides in the fact that even non-constant variations of the steering ratio can be determined and compensated for over the entire steering wheel angle range. Changes in the steering behavior of the vehicle, for example due to change of cargo or replacement of the steering gear, are sensed.

It will also be appreciated that the inventive method avoids laborious determination and manual input of values for determination of the steering ratio at the end of vehicle production, otherwise known as EOL (EOL: end of line). On the one hand, a more comfortable and simpler operation and manipulation is achieved, and, on the other hand, the time and effort for defining the steering geometry design in a manner specific to the vehicle or for parameter management in general is greatly reduced.

Advantageously, preliminary values for determining the steering ratio can already be learned automatically at EOL, under well-defined driving conditions, such as even roadway, homogeneous road surface, high coefficient of friction, etc., during standard vehicle tests. Also, preliminary rapid calibration can already be achieved at EOL, without allowance for thermal and/or time-dependent offset drifts of a steering wheel angle sensor and/or of a lateral-acceleration sensor. This can be achieved, for example, by a diagnostic request during adjustment of the vehicle track. Furthermore, by compensation of the zero-point drift of a sensor, it is ensured that a downstream system using the sensor values is capable of exerting better or in other words more accurate control actions.

Still other objects and advantages of the present invention will in part be obvious and will in part be apparent from the specification.

The present invention accordingly comprises the various steps and the relation of one or more of such steps with respect to each of the others, all as exemplified in the following detailed disclosure, and the scope of the invention will be indicated in the claims.

BRIEF DESCRIPTION OF THE DRAWINGS

For a fuller understanding of the present invention, reference is had to the following description, taken in connection with the accompanying drawings, in which.

DETAILED DESCRIPTION OF THE PREFERRED EMBODIMENTS

Figure 1:
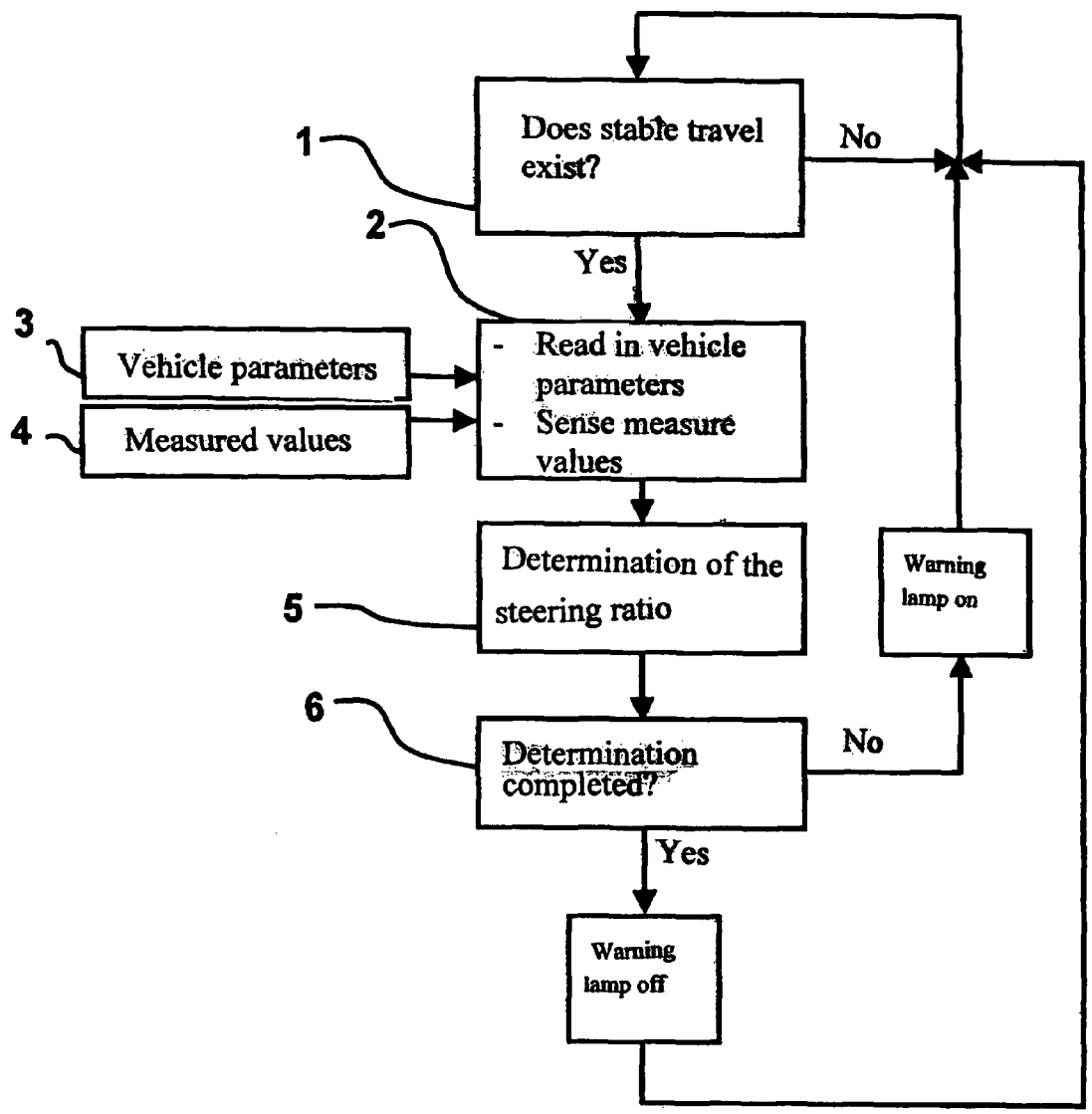
FIG. 1 is a flow diagram depicting a method for determining the steering ratio of a vehicle according to a preferred embodiment of the present invention.

Referring now to FIG. 1, in accordance with a preferred embodiment of the method of the present invention, in a first step 1, a determination is made as to whether stable travel of the vehicle exists. Generally, stable travel exists if the vehicle is neither being understeered nor oversteered—meaning that the actual behavior of the vehicle agrees with the specified behavior of the vehicle. This is generally the case when the lateral acceleration of the vehicle is small.

When stable travel exists, vehicle parameters (3) are read in and measured values (4) are sensed in a second step 2. Examples of vehicle parameters (3) include the self-steering gradient of the vehicle, the wheelbase and other vehicle dimensions. These vehicle parameters (3), such as the wheelbase, can be queried by a vehicle data bus (such as a CAN) or by other vehicle systems or from a data memory in the vehicle. The measured values (4) are primarily the yaw rate, steering wheel angle and vehicle speed. For this purpose, the yaw rate either can be measured by means of a yaw rate sensor or, for example, can be determined from the wheel speeds of rotation of the vehicle wheels. The steering wheel angle is usually sensed by means of a steering wheel angle sensor.

In a step 5, the steering ratio is determined from the read-in vehicle parameters (3) and the sensed measured values (4). The determination of the steering ratio will be described in greater detail hereinafter.

In a step 6, a check is made as to whether the determination of the steering ratio has been completed. As long as the determination of the steering ratio has not yet been completed, steps 1-3 will be iterated.

If determination of the steering ratio, for example in the form of a characteristic line, has not yet been completed, the vehicle operator can be alerted by a lit warning light, such as, for example, an ESC light, in the operator's cab. After completion of the determination of the steering ratio, the ratio is made available to further electronic systems, such as an ESC or RSC controller. If determination of the steering ratio has been completed, the vehicle operator can be alerted by the fact that the warning light goes off.

The steering ratio is needed in order to describe the steering behavior of a vehicle and to calculate the reference variable, or in other words the specified yaw rate, of a vehicle-stabilizing control action. The dynamic behavior of a vehicle can be described according to known methods of control technology by the time-dependent variation of an output variable relative to an input variable in the form of a transfer function. Thus, knowledge of this transfer function is used for evaluation of the dynamic behavior of a vehicle by control technology. The control demand of such a system is determined by comparing a calculated yaw rate with a measured yaw rate. Exact knowledge of the transfer characteristics of the vehicle is necessary if this reference variable or "specified yaw rate" is to be determined as exactly as possible.

The transfer function F(s) of the yaw rate for unsteady vehicle conditions is given by the relationship:

$$F(s) = \frac{\psi}{\delta_H/i_s} = \left(\frac{\psi}{\delta_H/i_s}\right)_{stat} * \frac{1 + T_z * s}{1 + \frac{2*D}{\omega}*s + \frac{1}{\omega^2}*s^2} \quad [1]$$

where
$\psi$: measured yaw rate (e.g., of the tractor vehicle)
$\delta_H$: steering wheel angle
$i_s$: steering ratio
$T_z$: counter time constant
s: Laplace operator $$\left(s = \frac{d}{dt}\right)$$

D: damping factor
$\omega$: undamped natural frequency

Simple determination of the steering ratio $i_s$ is possible in the steady-state region, since, there, the transfer function can be reduced to the static component as follows:

$$\left(\frac{\psi}{\delta_H/i_s}\right)_{stat} = \frac{v}{l + EG*v^2} \quad [2]$$

and so the yaw rate $\psi$ is given by:

$$\psi = \frac{\delta_H}{i_s\left(\frac{l}{v} + EG*v\right)} \quad [3]$$

where
v: vehicle speed
EG: self-steering gradient
l: wheelbase

The term "self-steering gradient EG" refers to a vehicle-specific variable whose value can be determined from the relationship specified in DIN 70000 or in ISO 8855, where it is described as "understeer gradient". In this connection, EG>0 means understeering vehicle behavior, EG=0 means neutral vehicle behavior, and EG<0 means oversteering vehicle behavior.

When the measured yaw rate $\psi$ is inserted in the function according to equation [3] above, the current steering ratio $i_s$ can be determined as a function of the steering wheel angle $\delta_H$ as follows:

$$i_s = \frac{\delta_H}{\psi\left(\frac{l}{v} + EG*v\right)} \quad [4]$$

Figure 2:
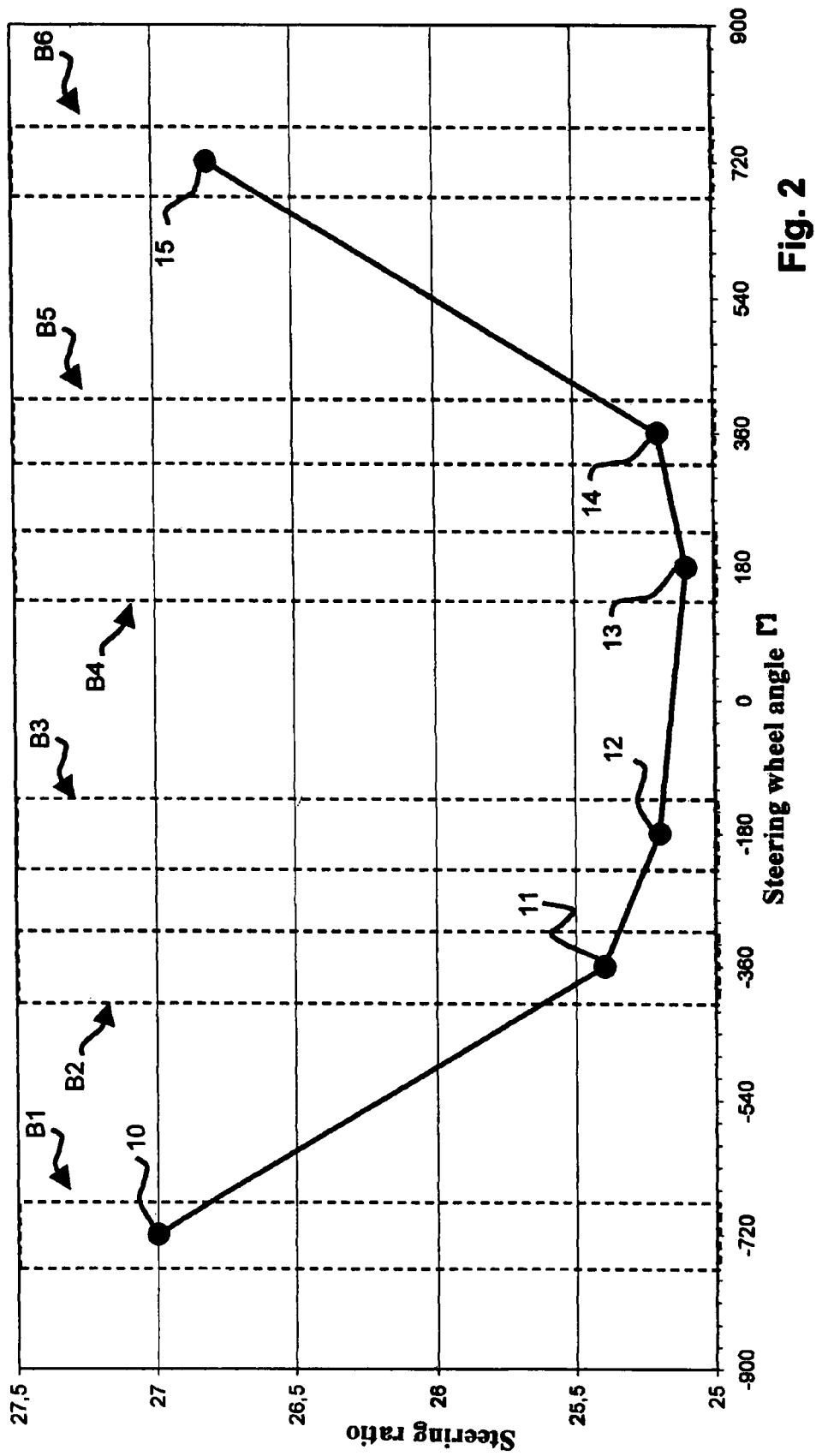
FIG. 2 is a graphical illustration of the relationship between steering ratio and steering wheel angle utilized in accordance with a preferred embodiment of the present invention.

The steering ratio $i_s$ of a vehicle typically follows a quasi-parabolic curve over the entire steering wheel angle range. Such a curve is plotted in FIG. 2. Since it is not possible to determine this function conclusively, an approximation of such a function is applied. The approximation is applied by determination of a plurality of appropriately distributed grid points (10, 11, 12, 13, 14, 15) of the determined steering ratio over the entire steering wheel angle range as well as by interpolation of intermediate values. For the interpolation, a polygonal sequence wherein each two grid points are joined by a straight line is used hereinafter. It should be appreciated that other interpolations such as, for example, splines, can also be used.

The steering wheel angle is divided into sub-ranges (B1, B2, B3, B4, B5, B6), whose range centers represent respective grid points (10, 11, 12, 13, 14, 15). For a first determination of the steering ratio $i_s$, first grid points can be learned at the conclusion of vehicle production (EOL), for example for a steering wheel angle of approximately ±360°. A provisional steering ratio is determined from these first grid points. These first grid points are learned, for example, at EOL, under well defined boundary conditions, such as level roadway, homogeneous road surface, high coefficient of friction, etc. Learning of grid points then takes place continuously during further operation of the vehicle.

Depending on steering wheel angle range, at least three ranges can be defined per steering direction. In this connection, "+" means rotation of the steering wheel counterclockwise, whereas "−" means rotation clockwise. Examples of possible suitable ranges would be +130° to +230°, +310° to +410° and +670° to +770°, as well as −130° to −230°, −310° to −410° and −670° to −770°.

The first grid points are appropriately placed at the centers of the ranges, or in other words at ±180°, ±360° and ±720°. A larger number of ranges and thus of grid points increases the accuracy of the results. The values lying between the grid points are interpolated. To increase the accuracy, several values are determined for each grid point. It is also possible to learn further values between the grid points in order to achieve a better approximation to the actual variation (quasi-parabolic) of the steering ratio $i_s$. The number of grid points and/or ranges can be chosen as a function of the maximum measured steering wheel angle. For example, in a vehicle with a maximum measured steering wheel angle of greater than ±720°, more grid points and/or ranges can be used than in a vehicle with a maximum measured steering wheel angle of ±720° or less. Furthermore, the distribution and/or number of grid points and/or ranges can also be chosen automatically.

In the respective range around the grid points, the value for the steering ratio $i_s$ can be determined according to equation [4] above. In this way, a data matrix is obtained that describes the steering ratio $i_s$ as a function of the measured yaw rate $\dot{\psi}$ and of the steering wheel angle $\delta_H$. As indicated above, the determination of the steering ratio $i_s$ takes place only during the existence of stable and predominantly steady-state driving conditions. When the steering ratio is known, the transfer characteristics of the vehicle and the specified yaw rate are determined.

The specified yaw rate is compared with a measured yaw rate or with a yaw rate calculated, for example, from the wheel speeds, in order to recognize unstable handling of the vehicle and to correct it via motor control and/or brake engagement. A control action is executed starting from a certain deviation (control threshold).

The amplitude of the control threshold depends on (a) the trustworthiness of the learned values (in this respect, many learned values are very trustworthy), (b) the tolerance of the measured values (yaw rate, steering wheel angle), and (c) other parameters in general.

In a further approach according to the present invention, an additional description of the dynamic behavior is used for transfer regions with unsteady vehicle conditions, since delays occur during changes of tire force and due to inertia effects of the vehicle mass. This additional dynamic behavior of the vehicle corresponds to a second-order filter function in the form:

$$F(s) = \frac{1 + T_z * s}{1 + \frac{2*D}{\omega} * s + \frac{1}{\omega^2} * s^2} \quad [5]$$

The unsteady vehicle behavior can be approximately described by pre-designating a yaw damping D and suitable natural frequency ω. Steering ratios can be determined even under partly unsteady driving conditions by calculating a steering ratio corrected in this way and applying suitable averaging methods. Thereby, the boundary conditions for learning the values for the individual grid points can be expanded. In this way, the learning operation is accelerated.

As mentioned above, errors with regard to an incorrect or inaccurate installation position of the steering wheel angle sensor as well as time-dependent or thermal changes can lead to a drift (offset) of the zero point of the steering wheel angle sensor. A zero-point drift can also occur in other sensors, such as in a yaw rate or a lateral-acceleration sensor. In order to further improve the quality of the sensor signals used for determination of the steering ratio in the inventive method, compensated sensor signals are used.

For this purpose, a zero-point drift is recognized and compensated for as rapidly as possible, so that downstream systems such as stability control systems or downstream learning algorithms assigned to compensated values can operate as soon as possible with correct sensor signals. Average values formed according to the present invention can therefore be used for compensation of zero drifts. The compensation is applied in a manner that takes measured yaw rate into consideration, but it is also possible to apply the compensation as a function of a yaw rate formed, for example, from the wheel speeds of rotation.

Hereinafter, a yaw rate measured by means of a yaw rate sensor will be used for what is known as a base variable, because of the relatively small susceptibility to error and because of the immediate availability of a reliable offset value after a vehicle standstill. For this signal, values time-averaged over 0.5 seconds are formed continuously during a standstill, and they are incorporated to different degrees in a total offset as a function of the safety of the standstill (pressure in the brakes, parking brake applied). Normally, a reliable offset exists after one second of standstill. If the standstill lasts longer, differences between the 0.5 second windows are evaluated for plausible changes that could suggest movement of the vehicle during the standstill (slight movement).

While the vehicle is traveling, time-averaged values can be determined continuously in, for example, 8-minute windows, during existing straight-ahead travel in order to be able to compensate for slow offset drifts. Straight-ahead travel, for present purposes, is to be understood to mean all driving conditions in which the value of the vehicle yaw rate is ≦2°/s. These time-averaged values are subtracted directly from the measured value of the yaw rate. If no standstill of the vehicle takes place after a restart (reset) of the system or of the vehicle, a travel average value is formed directly and taken as the offset after two 8-minute windows.

Calibration of the downstream sensor variables (lateral acceleration and/or steering wheel angle) takes place as a function of the base variable (yaw rate). For this purpose, average values of the deviations of lateral acceleration and steering wheel angle are first formed from the measured yaw rate for preselected (e.g., 25 m) distances during straight-ahead travel (MW1). Again, a driving condition in which the value of the yaw rate is ≦2°/s is considered to be straight-ahead travel. Since the calibration is related to the measured yaw rate, travel on gentle curves does not lead to a false offset. For initial learning of the zero-point drift of the lateral acceleration or of the steering wheel angle, the values of lateral acceleration or of steering wheel angle are first averaged over preselected (e.g., 250 m) driving distances, in order to obtain a sufficiently reliable offset after a reasonable time. When this first determined offset is known, the method for determination of the steering ratio can already be decisively improved, as can other methods requiring sensor signals that are as accurate as possible. In particular, therefore, an ESC/RSC functionality can be enabled, so that stability control can be executed if necessary.

After the first determination of the offset, a second average value of the first average values (MW1) is formed for preselected (e.g., 25 km) straight-ahead travel distances (MW2). For this purpose, continuous filtering of the MW1 values in the current offset is performed in order to avoid discontinuities in the corrected signals. The learned offsets together with all intermediate values can be stored in a data memory (such as, for example, the EEPROM of a stability control system), since these learned offsets are normally not changed. These stored offsets are read out after a reset (such as a vehicle start), so that the learning of the offset can be continued at the same point in order to determine the zero-point drift of sensors even more accurately.

According to one embodiment of the present invention, it is desirable to reset the learned offset and steering ratio and to trigger rapid new learning, for example via a CAN message or diagnostic, when a sudden change of the offset is probable, for example when different cargo or a different cargo distribution of the vehicle exists, or when new components (such as sensors) have been built into the vehicle, or when further influencing variables, such as steering linkage and/or steering gear, have been changed.

Furthermore, calibration trends can be sensed via counters, in order to recognize implausible values and to draw conclusions on the correctness of the learned offset via increased need for compensation. If implausible values are recognized, an automatic restart of the calibrations takes place.

Furthermore, time-dependent average values in which no allowance for the driving distance is made for lateral acceleration and steering wheel angle can also be formed.

Accordingly, the present invention provides a simple and cost-effective method for determining the steering ratio of a vehicle.

It will thus be seen that the objects set forth above, among those made apparent from the preceding description, are efficiently attained, and since certain changes may be made in carrying out the above method without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for determining the steering ratio of a vehicle, comprising the steps of determining whether a stable travel condition of a vehicle exists, when said stable travel condition exists, obtaining vehicle parameter information, obtaining sensed measured values associated with said vehicle, and calculating a steering ratio of said vehicle based on said vehicle parameter information and said sensed measured values.

2. The method according to claim 1, wherein said sensed measured values include a yaw rate, a steering wheel angle and speed of said vehicle.

3. The method according to claim 2, wherein said yaw rate is measured by means of a yaw rate sensor, and said steering wheel angle is measured by means of a steering wheel angle sensor.

4. The method according to claim 2, wherein yaw rates are obtained for a plurality of steering wheel angle grid points.

5. The method according to claim 4, wherein an entire range of said steering wheel angle is divided into a plurality of sub-ranges, each of said sub-ranges including at least one of said grid points.

6. The method according to claim 4, wherein values between said grid points are determined by interpolation.

7. The method according to claim 4, wherein at least two grid points are determined at the end of vehicle production.

8. The method according to claim 4, wherein said steering ratio is determined for each of said grid points.

9. The method according to claim 8, wherein a data matrix describing steering ratio variation is generated based on said steering ratio for each of said grid points.

10. The method according to claim 2, wherein at least one of said yaw rate, said steering wheel angle and a lateral acceleration of said vehicle is compensated for zero-point drift.

11. The method according to claim 10, wherein said compensation for zero-point drift is based on average values of said at least one of said yaw rate, said steering wheel angle and said lateral acceleration of said vehicle.

12. The method according to claim 11, wherein said average values are at least one of vehicle travel distance dependent and time dependent.

13. The method according to claim 10, wherein said yaw rate is measured by means of a yaw rate sensor, and said measured yaw rate is used as a base variable for said compensation for zero-point drift.

14. The method according to claim 13, wherein said base variable is determined during at least one of standstill and travel of said vehicle.

15. The method according to claim 13, wherein at least one of said steering wheel angle and said lateral acceleration is compensated for as a function of said base variable and as a function of at least one of vehicle travel distance and a time interval.

16. The method according to claim 1, wherein said vehicle parameter information includes at least one of a self-steering gradient, a wheelbase and dimensions of said vehicle.

17. The method according to claim 16, wherein said vehicle parameter information is obtained via at least one of a vehicle data bus, vehicle electronic systems and data memories.

18. The method according to claim 1, further comprising the step of generating a warning signal when said step of calculating said steering ratio is not complete.

19. A method for determining the steering ratio of a vehicle, comprising the steps of determining whether a stable travel condition of a vehicle exists, when said stable travel condition exists, obtaining vehicle parameter information, obtaining sensed measured values associated with said vehicle, and calculating a steering ratio $i_s$ of said vehicle based on said vehicle parameter information and said sensed measured values according to the relationship:

$$i_s = \frac{\delta_H}{\psi\left(\frac{l}{v} + EG * v\right)}$$

where:
 $\psi$: yaw rate
 $\delta_H$: steering wheel angle
 EG: self-steering gradient
 v: vehicle speed
 l: wheelbase.

* * * * *